United States Patent [19]
Hoehn

[11] Patent Number: 5,977,294
[45] Date of Patent: Nov. 2, 1999

[54] POLYMER DEFORMULATION BY SOLVENT SOLUTION FILTRATION

[75] Inventor: Andrew F. Hoehn, Mt. Vernon, Ind.

[73] Assignee: PRS, LLC, Mt. Vernon, Ind.

[21] Appl. No.: 08/855,388

[22] Filed: May 13, 1997

[51] Int. Cl.[6] .................. C08F 6/12; C08J 11/06
[52] U.S. Cl. ............ 528/482; 528/487; 528/490; 528/491; 528/493; 528/494; 528/497; 528/502 A; 521/40
[58] Field of Search .................... 521/40, 40.5; 528/482, 528/502 A, 490, 497, 487, 491, 493, 494

[56] References Cited

U.S. PATENT DOCUMENTS

| | | | |
|---|---|---|---|
| 3,944,513 | 3/1976 | Greenwald et al. | 528/482 |
| 4,184,027 | 1/1980 | Hopkins | 526/60 |
| 4,212,967 | 7/1980 | Govoni et al. | 528/500 |
| 4,379,525 | 4/1983 | Nowicki et al. | 241/20 |
| 4,584,421 | 4/1986 | Saito et al. | 585/241 |
| 4,642,401 | 2/1987 | Coenen et al. | 585/241 |
| 4,851,601 | 7/1989 | Fukuda et al. | 585/241 |
| 4,855,080 | 8/1989 | McConaghy et al. | 521/40.5 |
| 5,136,117 | 8/1992 | Paisley et al. | 585/241 |
| 5,198,471 | 3/1993 | Nauman et al. | 521/46.5 |
| 5,232,954 | 8/1993 | Peters | 521/47 |
| 5,266,601 | 11/1993 | Kyber et al. | 521/48.5 |
| 5,269,948 | 12/1993 | Krutchen | 210/774 |
| 5,278,282 | 1/1994 | Nauman et al. | 528/497 |
| 5,288,934 | 2/1994 | deBroqueville | 585/241 |
| 5,430,068 | 7/1995 | Subramanian | 521/40 |
| 5,445,659 | 8/1995 | Khan et al. | 48/197 R |
| 5,534,040 | 7/1996 | Khan et al. | 48/197 R |
| 5,554,657 | 9/1996 | Brownscombe et al. | 521/48 |

FOREIGN PATENT DOCUMENTS

| | | | |
|---|---|---|---|
| 4309427 | 9/1994 | Germany | 521/49.8 |

*Primary Examiner*—Fred Teskin
*Attorney, Agent, or Firm*—Jay G. Taylor; Russell E. Fowler, II; Ice Miller Donadio & Ryan

[57] ABSTRACT

A process for polymer deformulation by solvent solution filtration begins by including formulated polymers and/or polymer products in a recycle stream. The formulated polymer products include a quantity of soluble polymers and/or insoluble polymers, soluble and/or insoluble colorants, formulations and additives. The recycle stream is placed in a solvent, taking the polymer and formulations into a solvent/polymer solution. Next, the solution is processed through a filtration stage. A quantity of mineral filter aid particles are then added to the solution to adsorb formulations contained in the solution. One of the mineral filter aids must be some form of carbon, preferably activated carbon. Other mineral filter aids may include diatomaceous earth. The solvent/polymer solution is then subjected to an additional polish filtration stage to remove substantially all of the mineral filter agents and associated formulations. Following filtration, a quality check is performed on the solvent/polymer solution to determine whether additional filtering of the solution is required. If additional filtering of the solution is required, the filtering process is repeated. If no additional filtering is required, the deformulated polymer is separated from the solution, and the deformulated polymer is allowed to dry.

20 Claims, 1 Drawing Sheet

POLYMER DEFORMULATION BY SOLVENT SOLUTION FILTRATION

FIELD OF THE INVENTION

This invention relates to a process for deformulating formulated polymers. In particular, this invention relates to a process for deformulating polymers (including plastics, polymers, copolymers and polymer combinations) to their near original pre-formulated state rendering a pure, clean polymer with comparable physical and chemical properties to those of the pre-formulated polymer. More particularly, this invention relates to a process for removing colorants, formulations, and other additives from formulated polymers by dissolving the formulated polymers in a solution by the use of an appropriate solvent, exposing the solution to various mineral filtration aids, filtering the solution through a filter or series of filters to remove the colorants, formulations, and other additives, then separating the solvent from the polymers to recover the pure deformulated polymers from the solution.

BACKGROUND OF THE INVENTION

Polycarbonates and other soluble polymers, copolymers and polymer combinations (hereinafter collectively referred to as "polymers") are used extensively for a variety of industrial and consumer product applications including automobile parts, compact discs, and roadway signs to name a few. In a pure, clean unformulated state, soluble polymers may be used for any number of applications. Once a polymer is designated for a product application, the polymer encounters incorporation of colorants, formulations and other additives to yield a desired property package, processing consistency, and coloration. Polymers that have been subject to such incorporations are sometimes referred to as formulated polymers. These formulated polymers are generally in the form of small pellets until they are actually used to make products.

A certain quantity of unused formulated polymers may be discarded to a recycle stream during a molding process, or other process used to make the polymer products. Inclusion of a formulated polymer into a recycle stream often occurs when the polymer is in excess of that needed for the product or if the polymer is remaining trim from the product after molding. Additionally, commercial, industrial, and other consumers discard products containing formulated polymers following the useful life of the products. Once discarded, formulated polymers may be recycled and reused in other products. Because a large volume of polymers used in commercial, industrial, and consumer products are eventually discarded, polymer recycling and recovery is desirable for conservation of natural resources and other environmental considerations. However, current polymer recycling processes do not completely restore formulated polymers to their pure, clean unformulated state, because formulated polymers are not easily separated from their additives. Thus, even after current recycling techniques, many formulated polymers continue to contain many of the same additives as contained in previous formulation packages. Accordingly, subsequent uses of formulated polymers require increased additives for use in association with a new formulation package to hide the original formulation package. These further formulated polymers exhibit increasingly unpredictable characteristics caused by the increased use of additives, and polymer reprocessing becomes increasingly difficult and limited. Continued reformulation of previous formulations causes degradation of the products for which the polymers may be used. As this degradation of use is repeated, the polymer's properties also erode as the additives increase. Eventually, the polymer will have little or no value in the marketplace.

Therefore, while an unformulated polymer has almost unlimited applications, initial formulation of that polymer limits subsequent applications, and reformulation of the initial formulation limits applications even further. By way of example, consider a clear polymer substantially free of formulations such that the polymer is used to make window glazing. Following the useful life of the window glazing, the polymer is recycled and designated for re-use in a tan colored article. Before the polymer is used in the tan colored article, the polymer must be formulated to give the polymer the appropriate article characteristics, e.g., tan coloration. Following recycling of the tan colored article, attempted re-use of the now formulated polymer might be limited to applications for brown articles. Additional reprocessing of the polymer may further limit potential polymer applications such that the polymer might only be used to make black articles, or articles of some other color that will hide the brown.

Accordingly, it would be of advantage if the polymer recycling process could completely separate all additives from a polymer (i.e., deformulate the polymer) with little, if any, loss in the original chemical and physical properties of the polymer. Such deformulated polymers could then be re-used in any products and in any manner appropriate for use of the original polymer. For example, the black articles in the above illustration could be deformulated and used again as a window glazing. With an increased number of applications available for the recycled polymer, demand for the polymer would increase along with the value of the polymer.

Some prior art processes disclose techniques for separating or recycling plastics such as U.S. Pat. No. 5,278,282 to Nauman et al. Nauman et al. involves mixing commingled plastics with a solvent at various temperatures, and extracting certain polymers from the solution at particular temperatures. Nauman filters any contaminates from the solution which are not dissolved by the solvent. However, this process fails to remove all additives from the polymers. Therefore, although the polymers are separate at the conclusion of the Nauman process, the polymers are still formulated, i.e., still contain some additives.

Similarly, U.S. Pat. No. 5,269,948 to Krutchen discloses a process for purifying waste contaminated polystyrene by dissolving the polystyrene in a solvent to form a solution, and recovering the contaminate free solution. However, the Krutchen process only discloses removal of accumulated waste products such as dirt and food particles, it does not disclose removal of any additives included in the original polystyrene product.

Accordingly, there is a need in the industry for a process which will remove additives such as pigments and dyes from polymers and result in an unformulated polymer that may be used in the same manner as the original unformulated polymer.

SUMMARY OF THE INVENTION

The present invention provides an innovative process for deformulating and removing nearly all fillers, pigments, dyes, and other additives from soluble plastics and polymers (including polymers, copolymers and polymer combinations) by: (1) combining a polymer product having formulations with an appropriate solvent to form a polymer/ solvent solution; (2) processing the solution through a filter or series of filters to remove any visible fillers and/or additives (e.g., fiberglass, aluminum, mica, etc.); (3) exposing the solution to various mineral filtration aids including carbon, activated carbon and/or diatomaceous earth to allow adsorption of many of the formulations; (4) processing the solution again through a filter or series of filters down to about 0.01 microns or smaller to clarify or polish the solution by removing substantially all remaining additive formulations; and (5) separating the polymer/solvent solution by any methods known to the industry (i.e., steam precipitation, chemical precipitation, extrusion devolatization, etc.), leaving the isolated polymer deformulated.

Accordingly, it is an object of the invention to provide a method for separating colorants, formulations, and other additives from formulated polymers so that the polymers are returned to a substantially pure, unformulated state.

A further object of the invention is to provide a method for removing formulations from soluble polymers and returning the polymers to a pure, unformulated condition with little, if any, loss in the original physical properties of the polymer.

DETAILED DESCRIPTION OF THE INVENTION

Figure 1:
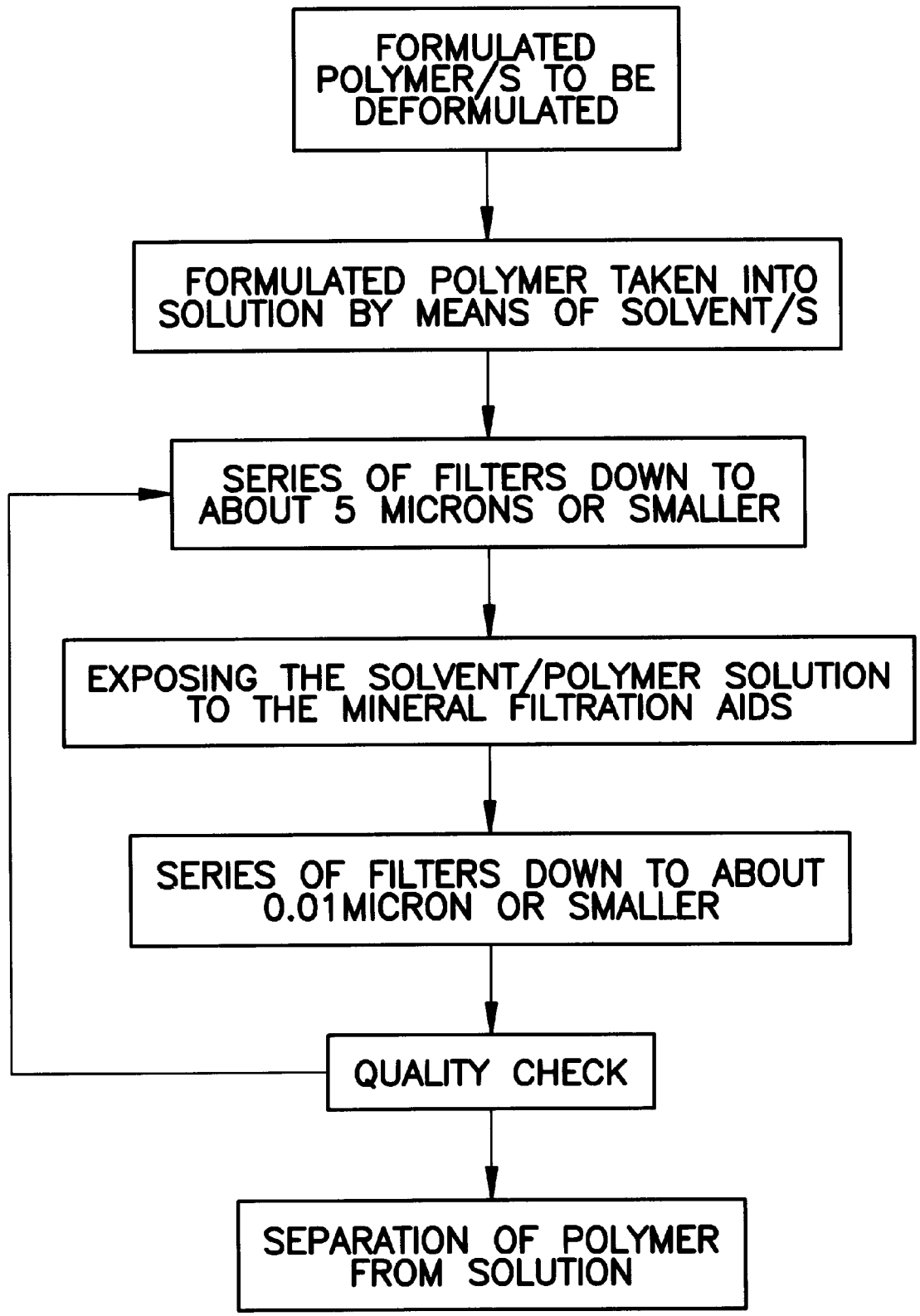
FIG. 1 is a flow chart of the present invention showing an embodiment of a polymer deformulation process in accordance with the present invention.

As shown in FIG. 1, a process for polymer deformulation by solvent solution filtration begins by including a quantity of formulated polymers and/or polymer products in a recycle stream. Formulated polymers and polymer products include any soluble or insoluble polymers, copolymers and commingled polymers and copolymers having formulations. As used herein, the term "polymer" shall mean any polymer, copolymer or combination of polymers and copolymers. Also for the purpose of this description, formulations are defined to mean constituents added to the polymer including soluble and/or insoluble colorants, additives or other ingredients incorporated into the polymer. The recycle stream is combined with an appropriate solvent for taking the soluble formulated polymer into a solvent/polymer solution containing both soluble and insoluble polymers and formulations. Next, the solution is processed through a first filtration stage utilizing staged filtration from about 200 microns down to about 5 microns or lower to remove the more visible formulations (generally, insoluble particles of fiberglass, aluminum, and/or insoluble polymers, etc.) from the solution. Following this first filtration process, the solution is exposed to mineral filtration aids to allow maximum adsorption of the formulations contained in the solution. One of the mineral filtration aids is some form of either activated or non-activated carbon, and the mineral filtration aids may also include diatomaceous earth. The solution is then passed through a second filtration stage. The second filtration stage is a clarifying or polishing step utilizing staged filtration down to about 0.01 microns or lower. Following filtration in the second stage, a quality check is performed on the solvent/polymer solution to determine whether sufficient purification and clarification has occurred and whether additional filtering of the solution is required. If additional filtering is required, the polymer/solvent solution is reintroduced into the process at the first filtration stage, and the process is repeated. If no additional filtering is required following the quality check, the deformulated polymer is separated from the polymer/solvent solution by steam precipitation, or other suitable separation means, and the deformulated polymer is dried.

As outlined above, the first step toward polymer deformulation by solvent solution filtration is to assemble a recycle stream by gathering pellets and/or recycled products composed primarily of a single type of formulated polymer. Pellets and recycled products of the soluble polymer are most desirable for use, but other insoluble polymers may also be incorporated as the first filtration stage will remove them from the solution. The recycle stream of formulated polymer should first be sorted and then washed with a water or detergent spray to remove any undesirable foreign material from the surface of the products. Following this, the formulated polymer may be ground into finer particles to enhance transformation of the polymer into solution.

Next, the formulated polymers are combined with a solvent to form a solution. Other insoluble constituents (e.g., fiberglass, mica, insoluble polymers, etc.) found in the solution do not dissolve and therefore do not go into solution. Methylene chloride (dichloromethane) is one of several solvents that may be used to take the polymers into solution. However, any suitable substitute solvents may also be used (e.g., tetrachloroethane, dichlorobenzene, dichloroethane, chloroform, trichloroethane, thiophene, dioxane, tetrahydrofuran, monochlorobenzene, benzene, acetophenone, etc.) depending on the polymer to be dissolved. As one of ordinary skill in the art will perceive, a variety of different solvents may be used, and selection of the solvent is dependant upon the particular polymer that is to be dissolved and processed. Preferably, a solvent is available and used which will take only the polymer of choice into solution, leaving the insoluble constituents and polymers to become trapped when they enter the first stage of the filtration process.

If methylene chloride is used as the solvent, it should be used in a weight ratio of about nine parts solvent to about one part formulated soluble polymer. This 9:1 ratio of solvent to solid is generally sufficient to completely take the formulated polymer into solution and allow it to easily pass through the filtration process. However, the ratio of solvents to polymer will depend upon both the solvent selected and the polymer to be dissolved. Sufficient solvent is necessary to dissolve the polymer to the point where it can be conveniently passed through the filters. In any event, agitation of the solution will assist in taking the polymer and any soluble constituents into solution.

Following polymer dissolution, a first filtration stage occurs wherein the polymer/solvent solution is passed through a filter or series of filters to remove all constituents capable of being trapped by the filters. The trapped constituents will generally be insoluble ingredients in the polymer. Filter volume size and pore size should be evaluated such that no single filter in a series of filters is trapping most of the insolubles. In a filter series arrangement, filters should be connected in a series with pore sizes descending from about 200 microns down to about 5 microns. Simple canister type bag filters (e.g., Rosedale, Strainrite, etc.) are effective for use in the present invention. Pumping the solution will assist in the filtration step by forcing the solution through each filter and reducing the time required to implement the filtration stage.

Next, the solution of formulated polymer is exposed to a mineral filtration aid, the most effective mineral filtration aid being activated carbon. The ratio of activated carbon to pre-solution dry formulated polymer should be about one part activated carbon to about fifty parts pre-solution dry formulated polymer. This ratio is derived by estimating the level of organic constituents in the formulation package used in the production and subsequent reformulation of the polymer, and then multiplying that level by 1.1 to allow for maximum and complete exposure of these constituents to the activated carbon. Use of other mineral filtration aids such as unactivated carbon and/or diatomaceous earth along with the activated carbon may assist in the filtration process.

Activated carbon and other mineral filtration aids may effectively be exposed to the solution by passing the solution through a column and/or series of columns having a bed of activated carbon or other mineral filtration aids incorporated in the column. The solution may be allowed to continuously pass through the columns. Column volume is determined by the desired frequency of column change and/or reactivation of the carbon bed. Alternatively, the solution may be exposed to the mineral filtration aid by directly mixing finely divided particles of the mineral filtration aid with the solution. In addition to exposing the solution to the mineral filtration aid following the first filtration stage, mineral filtration aid may also be advantageously exposed to the solution immediately after the formulated polymer has been combined with the solvent (i.e., before the first filtration stage). Again, the ratio of activated carbon to pre-solution dry formulated polymer should be about one part activated carbon to about fifty parts pre-solution dry formulated polymer. The same method for calculating this ratio may be used as disclosed in the above paragraph.

The activated carbon, carbon and/or diatomaceous earth particles exposed to the solution are thought to combine physically with the soluble and/or organic additive constituents of the solution. This process of capturing and/or restraining the colorants and other formulations that have been added to the formulated polymer it is believed involves adsorption or adhesion of the formulations of the polymer onto the surface of the mineral filtration aids.

Because of the relationship between mineral filtration aid surface area exposure to the solution and the efficiency and effectiveness of the disclosed process, the size of the activated carbon and other mineral filtration aids is very important. Therefore, the activated carbon and other mineral filtration aids must be as small as possible to expose maximum surface area, but large enough not to pass through the second filtration stage. Therefore, only carbon particles of sufficient diameter to be captured by one of the filters from the second filtration stage should be added to the solution. Any appropriately sized carbon and other mineral filtration aids may be used from a suitable supplier. For example, activated carbon manufactured by Calgon has been used in the present invention ranging in size from type "C" pulverized (ultra fine powder) to type "CAL" 12×40. Because of the need for a maximum and effective amount of carbon surface area, activated carbon is preferred for use in the disclosed process.

The solution is next passed through the second filtration stage involving a filter or series of filters. The second filtration stage removes any remaining fine constituents of the formulation and/or any small particles of mineral filtration aid that may remain with the solution. The filters of the second filtration stage are preferably cartridge filters, or other similar filters, such that absolute filtration may be accomplished from about ten microns in size down to about 0.01 micron in size or smaller. This final stage of filtration is often referred to as clarifying or polish filtration. The final filter element in polish filtration is designed to effectively remove all constituents of the formulation that are intended to be removed. Pumping the solution under pressure may assist in clarifying or polish filtration.

An inspection, or quality check, of the filtered solution is performed following the second filtration stage. The quality check involves an inspection of the filtered solution by various conventional methods. Among these conventional methods of inspection are standard visual inspections, such as the International Commission on Illumination's standardized method for quantifying color developed in 1931, and also instrument inspections, such as the ColorQUEST Spectrocolorimeter Sphere. At a minimum, a simple visual inspection of the filtered solution should be conducted by a human. A simple visual inspection involves physical observation of the solution by a human eyeball for any residue and color remaining in the filtered solution. Filtered solutions that have been deprived of insoluble particulate matter are said to be clean. Filtered solutions that are colorless are said to be clear. If the quality check determines that the solution is "clean and clear," the solution is passed to the next process step for separation of the deformulated polymer from the solution. If the filtered solution is not "clean and clear," formulations remain and further filtration is required.

Solutions that do not pass the quality check as "clean and clear" are returned to the first filtration stage, and the process is repeated. After being filtered again by the first filtration stage, a solution that did not pass the quality check should be exposed to various mineral filtration aids, including activated carbon, carbon and/or diatomaceous earth. Thereafter, the solution should be made to pass through the second filtration stage. For solutions that were not "clean," at least one filter should be used with a smaller mesh size than the smallest filter used in any earlier filtration stage. A second process round is generally sufficient to remove all color and particles from the solution. However, the process should be repeated, as indicated in FIG. 1, until the solution is "clean and clear" and passes the quality check.

After the solution has passed the quality check, the polymer may be considered a deformulated polymer, and the deformulated polymer must be separated from the solution. Separation of the polymer from the solution may be accomplished by steam charging, chemical precipitation, or any conventionally known method in the industry. Separation of the polymer from the solution will cause the polymer to fall from the solution and take on a powder form. After removing the powdered polymer from the solution, the polymer will retain some moisture from the solution. Accordingly, polymer drying is required before the process is complete. In this final step, the separated polymer may be dried by any suitable method including air drying, heat treatment, or any other acceptable method known in the industry.

The following experiments demonstrate the use of carbon and/or activated carbon along with optional concentrations of diatomaceous earth, and/or other mineral filtration aids as a remedy for solution polymer deformulation to a clean, clear state permitting purified deformulated polymer recovery.

EXAMPLE 1

White pigmented post consumer polycarbonate containing 5–10% fiberglass was dissolved in methylene chloride at about a 10% solids ratio. This solution was then filtered through a 5 micron filter element. Subsequently, the solution was filtered through 1 micron, and 0.5 micron filters. The resulting solution was clean, but a cloudy tint remained.

Carbon, activated carbon, and diatomaceous earth were then added to the solution, and the filtration process was repeated. The resulting solution was both clean and clear. The polymer was isolated by removing the solvent. The deformulated polymer was also clean and clear after removal from the solution. Samples of the isolated polymer were then molded and tested. The physical and chemical properties were comparable to the original natural resin that had never been formulated.

EXAMPLE 2

Black colored post consumer polycarbonate containing 5–10% fiberglass was dissolved in methylene chloride at about a 10% solids ratio. This solution was then filtered through a 5 micron filter element. Subsequently, the solution was filtered through 1 micron and 0.5 micron filters. The resulting solution was clean, but an amber tint remained. Carbon, activated carbon, and diatomaceous earth were then added to the solution and the filtration process was repeated. The resulting solution was now both clean and clear. The polymer was isolated by removing the solvent. The deformulated polymer was also clean and clear. Samples of the isolated polymer were then molded and tested. The physical and chemical properties were comparable to the original natural resin that had never been formulated.

EXAMPLE 3

Post consumer black polycarbonate/ABS blend material was dissolved in methylene chloride at about a 10% solids ratio. This solution was then filtered through a 5 micron filter element. Subsequently, the solution was filtered through 1 micron and 0.5 micron filters. The resulting solution was clean, but a color tint still remained. Carbon, activated carbon, and diatomaceous earth were then added to the solution and the filtration process was repeated. The resulting solution was now both clean and clear. The polymer was isolated by removing the solvent. The deformulated polymer was also clean and clear. Samples of the isolated polymer were then molded and tested. The physical and chemical properties were comparable to the original natural resin that had never been formulated.

EXAMPLE 4

Examples 1–3 were repeated with the sole exception that tetrachloroethane was used as the solvent. The results of each test were the same as in examples 1–3.

While the preferred embodiment disclosed and described herein fulfills the objective standards of the present invention, this invention is not intended to be confined to the particular preferred embodiment. Accordingly the present invention is susceptible to various modifications without departing from the scope of the appended claims.

What is claimed is:

1. A method for removing formulations from a selected formulated polymer comprising the steps of:
   (a) combining the selected formulated polymer with a quantity of a solvent capable of taking the selected formulated polymer into solution, thereby forming a formulated polymer and solvent solution;
   (b) exposing the formulated polymer and solvent solution to an effective quantity of mineral filtration aid comprising activated carbon particles, wherein the formulated polymer and solvent solution is exposed to the activated carbon particles so that at least a portion of the activated carbon particles will either adsorb or form physical bonds with at least a portion of the formulations;
   (c) filtering the combination of the solution and the activated carbon particles through a second filter medium operable to remove substantially all of the activated carbon particles; and
   (d) separating the polymer from the solution.

2. The method of claim 1 further comprising the additional step of filtering the formulated polymer and solvent solution through a first filter medium before step (b) to remove a portion of formulations from the solution.

3. The method of claim 1 wherein the second filter medium has pores of a size capable of removing substantially all of the activated carbon particles.

4. The method of claim 1 wherein the mineral filtration aid further comprise unactivated carbon particles so that at least a portion of the unactivated carbon particles will either adsorb or form physical bonds with at least a portion of the formulations.

5. The method of claim 1 wherein the mineral filtration aid further comprise diatomaceous earth particles so that at least a portion of the diatomaceous earth particles will either adsorb or form physical bonds with at least a portion of the formulations.

6. The method of claim 1 wherein the quantity of solvent is mixed with the polymer at a ratio of about 9:1.

7. The method of claim 1 in which the solvent is selected from the group consisting of methylene chloride, tetrachloroethane, dichlorobenzene, dichloroethane, chloroform, trichloroethane, thiophene, dioxane, tetrahydrofuran, monochlorobenzene, benzene, and acetophenone.

8. The method of claim 1 wherein the second filter medium comprises a series of filters having diminishing pore sizes ranging between about 200 microns and about 0.01 micron.

9. The method of claim 1 wherein the second filter medium is a cartridge filter.

10. The method of claim 1, 4 or 5 wherein the formulated polymer and solvent solution is exposed to the mineral filtration aid by placing the mineral filtration aid in a column and passing the solution through the column.

11. The method of claim 1 wherein the formulated polymer and solvent solution is exposed to the mineral filtration aid by mixing the mineral filtration aid with the solution.

12. The method of claim 1 in which the polymer is separated from the solution by steam charging.

13. The method of claim 1 in which the polymer is separated from the solution by chemical precipitation.

14. The method of claim 1 wherein the polymer is dried following separation from the solution.

15. A method of removing formulations from a selected formulated polymer comprising the steps of:
   (a) combining the selected formulated polymer with a quantity of a solvent capable of taking the selected formulated polymer into solution, thereby forming a formulated polymer and solvent solution;
   (b) exposing the formulated polymer and solvent solution to an effective quantity of mineral filtration aid particles, said mineral filtration aid particles comprising carbon, wherein the formulated polymer and solvent solution is exposed to the mineral filtration aid particles so that at least a portion of the mineral filtration aid particles will either adsorb or form physical bonds with at least a portion of the formulations;
   (c) filtering the combination of the solution and the mineral filtration aid particles through a second filter medium having pores of a size operable to remove substantially all of the mineral filtration aid particles to produce filtered solution;

(d) performing an inspection on the filtered solution to determine if an acceptable quantity of formulations have been removed;

(e) performing steps (b) (c) and (d) again if the acceptable quantity of formulations have not been removed; and (f) separating the polymer from the filtered solution once an acceptable quantity of formulations have been removed from the filtered solution.

16. The method of claim 15 further comprising the step of filtering the formulated polymer and solvent solution through a first filter medium before step (b) to remove a portion of the formulations from the solution.

17. The method of claim 15 wherein the mineral filtration aid particles further comprise particles selected from a group consisting of activated carbon, non-activated carbon and diatomaceous earth.

18. The method of claim 15 wherein the mineral filtration aid particles further comprise one or more of the following: activated carbon particles, unactivated carbon particles, and diatomaceous earth particles.

19. A method of removing formulations from a selected formulated polymer comprising the steps of:

(a) combining the selected formulated polymer with a quantity of a solvent capable of taking the selected formulated polymer into solution, thereby forming a formulated polymer and solvent solution;

(b) filtering the formulated polymer and solvent solution through a first filter medium to remove a portion of the formulations from the solution;

(c) exposing the formulated polymer and solvent solution to an effective quantity of mineral filtration aid particles, said mineral filtration aid particles comprising carbon, wherein the formulated polymer and solvent solution is exposed to the mineral filtration aid particles so that at least a portion of the mineral filtration aid particles will either adsorb or form physical bonds with at least a portion of the formulations;

(d) filtering the combination of the solution and the mineral filtration aid particles through a second filter medium having pores of a size operable to remove substantially all of the mineral filtration aid particles to produce filtered solution;

(e) performing an inspection on the filtered solution to determine if an acceptable quantity of formulations have been removed;

(f) performing steps (b) (c) and (d) again if the acceptable quantity of formulations have not been removed; and (g) separating the polymer from the filtered solution once an acceptable quantity of formulations have been removed from the filtered solution.

20. The method of claim 18 wherein the mineral filtration aid particles further comprise particles selected from a group consisting of activated carbon, non-activated carbon and diatomaceous earth.

\* \* \* \* \*